United States Patent
Nodera

(10) Patent No.: US 7,307,120 B2
(45) Date of Patent: Dec. 11, 2007

(54) THERMOPLASTIC RESIN COMPOSITION, POLYCARBONATE RESIN COMPOSITION, AND MOLDED ARTICLE THEREOF

(75) Inventor: Akio Nodera, Chiba (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 63 days.

(21) Appl. No.: 10/500,458

(22) PCT Filed: Jan. 28, 2003

(86) PCT No.: PCT/EP03/00760

§ 371 (c)(1),
(2), (4) Date: Nov. 18, 2005

(87) PCT Pub. No.: WO03/064536

PCT Pub. Date: Aug. 7, 2003

(65) Prior Publication Data

US 2006/0089434 A1    Apr. 27, 2006

(30) Foreign Application Priority Data

Jan. 30, 2002 (JP) .............................. 2002-021023
Jan. 30, 2002 (JP) .............................. 2002-021024
Dec. 3, 2002 (JP) .............................. 2002-350850

(51) Int. Cl.
*C08K 3/04* (2006.01)
(52) U.S. Cl. ............. 524/496; 524/127; 524/140; 524/141; 524/165
(58) Field of Classification Search ........ 524/495–496, 524/127, 140–141, 165
See application file for complete search history.

(56) References Cited

U.S. PATENT DOCUMENTS 6,365,677 B1* 4/2002 Bolluijt et al. .............. 525/397
6,388,046 B1* 5/2002 Campbell et al. ........... 528/198
6,919,394 B2* 7/2005 Miyoshi et al. ............. 524/424
2003/0213939 A1* 11/2003 Narayan et al. ............ 252/500
2004/0105726 A1* 6/2004 Hannay et al. ............. 405/230
2006/0115640 A1* 6/2006 Yodh et al. ................. 428/221

FOREIGN PATENT DOCUMENTS

| EP | 0 595 141 | 5/1994 |
|---|---|---|
| EP | 0 692 522 | 1/1996 |
| EP | 1052654 | 11/2000 |
| EP | 1 367 097 | 12/2003 |
| JP | 04 268362 | 9/1992 |
| JP | 2000-281905 | 10/2000 |
| JP | 2003-12939 | 1/2003 |
| JP | 2003-55544 | 2/2003 |
| WO | 00/58211 | 10/2000 |
| WO | 00/69958 | 11/2000 |
| WO | 03/025069 | 3/2003 |

* cited by examiner

*Primary Examiner*—Peter Szekely
(74) *Attorney, Agent, or Firm*—Oblon, Spivak, McClelland, Maier & Neustadt, P.C.

(57) ABSTRACT

The present invention provides a thermoplastic resin composition containing 100 parts by mass of a mixture of a thermoplastic resin (A) and carbon nanotubes (B), the mixture being composed of the component (A) in an amount of 20 to 99.95 mass % and the component (B) in an amount of 0.05 to 20 mass %; a flame retardant (C) in an amount of 0.05 to 30 parts by mass; and a polyfluoroolefin resin in an amount of 0 to 2 parts by mass.

The flame retardant is preferably a phosphorus compound, and the thermoplastic resin preferably contains, as a component, an aromatic polycarbonate-polyorganosiloxane copolymer.

22 Claims, No Drawings

THERMOPLASTIC RESIN COMPOSITION, POLYCARBONATE RESIN COMPOSITION, AND MOLDED ARTICLE THEREOF

TECHNICAL FIELD

A first invention (hereinafter referred to as invention 1) relates to a novel thermoplastic resin composition and, more particularly, to a thermoplastic resin composition including a thermoplastic resin, carbon nanotubes, a flame retardant, etc. and having excellent flame retardancy, impact strength, and conductivity, and providing a molded product of excellent appearance.

A second invention (hereinafter referred to as invention 2) relates to a novel thermoplastic resin composition and, more particularly, to a thermoplastic resin composition including a thermoplastic resin, carbon nanotubes, and at least one compound selected from among a phosphorus compound, a phenolic compound, an epoxy compound, and a sulfur compound and having excellent flame retardancy, impact strength, and conductivity and providing a molded product of excellent appearance.

A third invention (hereinafter referred to as invention 3) relates to a novel polycarbonate resin composition and, more particularly, to a polycarbonate resin composition including an aromatic polycarbonate-polyorganosiloxane copolymer, carbon nanotubes, etc. and having excellent flame retardancy, impact strength, and conductivity, and providing a molded product of excellent appearance.

The present invention also relates to a molded product of each of the aforementioned resin compositions.

BACKGROUND ART

In recent years, data processing devices and electronic office apparatuses have rapidly spread as a result of technical development in the electronics field.

Wider use of electronic apparatuses entails increased incidences of malfunction and other problems. For example, trouble occurs with electromagnetic waves, in that noises generated from electronic parts affect other apparatuses provided near the electronic parts, leading to occurrence of malfunction caused by electrostaticity. Such trouble has been a serious problem to be solved.

In order to solve the problem, there is demand for materials having excellent conductivity and anti-staticity.

Conventionally, electrically conductive polymer materials which include a polymer material having poor conductivity with conductive fillers or other additives have been widely used.

Generally, metallic fibers, metallic powder, carbon black, and carbon fibers are employed as the aforementioned fillers. When employed as a conductive filler, metallic fibers or metallic powder exhibits an excellent effect of imparting conductivity. However, such a filler raises problems, in that a resin composition containing the filler has poor corrosion resistance and that satisfactory mechanical strength is difficult to attain.

When carbon black is employed as a conductive filler, conductive carbon black products such as Ketjen black, Vulcan XC72, and acetylene black are employed, since addition of such products in a small amount imparts high conductivity. However, dispersibility of these carbon black products in resin is unsatisfactory.

Dispersibility of carbon black incorporated to the resin composition greatly affects the electric conductivity of a resin composition. Therefore, a specific technique for incorporating carbon black in or mixing carbon black with resin is required so as to attain reliable conductivity of the resulting resin composition.

When carbon fibers generally employed as reinforcement materials are employed as conductive fillers, a desired strength and elasticity can be attained. However, in order to impart conductivity to resin, carbon fibers must be charged in the resin at high density, and such high-density charging deteriorates intrinsic properties of the resin.

In addition, when a molded product of complex shape is produced, delocalization of conductive fillers occurs, thereby failing to attain uniformity on conductivity, making the resultant product unsatisfactory.

Carbon fibers of a smaller fiber diameter provide a larger contact area between the fibers and resin at a given amount of the carbon fibers, and therefore, such carbon fibers are expected to impart higher conductivity to the resin.

Japanese kohyo Patent Publication 62-500943 discloses extrafine carbon fibrils having excellent conductivity.

However, the fibrils have poor dispersibility in resin upon mixing, failing to attain satisfactory appearance in molded products.

When a known pigment carbon black is employed as a colorant, a large amount of carbon black must be used for blacking the resin. Such a large amount of carbon black raises problems in terms of dispersibility to resin and surface appearance of molded products.

Japanese patent Application Laid-Open (kokai) No. 3-74465 also discloses a method of adding ultrafine carbon fibrils to resin. This patent document does not describe flame retardancy provided by ultrafine carbon fibrils and never mentions combinatory effect of ultrafine carbon fibrils with a flame retardant.

In addition, flame retardancy provided through the disclosed method is unsatisfactory. Thus, the method cannot be employed for producing a molded product which requires high flame retardancy.

Because of poor dispersibility, carbon fibrils must be added in an increased amount to resin in order to enhance conductivity.

Japanese patent Application Laid-Open (kokai) No. 4-268362 discloses a method of adding conductive carbon to a polycarbonate-polydimethylsiloxane copolymer (PC-PDMS). Since carbon black is used as the conductive carbon, a certain limitation is imposed on the conductivity to be attained. Separation of carbon from the matrix copolymer may also pose a problem during use of the copolymer.

The patent document fails to disclose anything on flame retardancy.

The present invention has been conceived under such circumstances.

An object of invention 1 is to provide a flame-retardant thermoplastic resin composition having electric conductivity. Another object is to provide a molded product of the composition having excellent appearance and enhanced mechanical strength.

An object of invention 2 is to provide an electrically conductive thermoplastic resin composition having high flame retardancy. Another object is to provide a molded product of the composition having excellent appearance and enhanced mechanical strength.

An object of invention 3 is to provide an electrically conductive polycarbonate resin composition having high flame retardancy. Another object is to provide a molded product of the composition having excellent appearance and enhanced mechanical strength.

DISCLOSURE OF THE INVENTION

The present inventors have conducted extensive studies in order to solve the aforementioned problems, and have found that an electrically conductive material of high impact strength and imparted with flame retardancy can be produced by blending a thermoplastic resin with carbon nanotubes, a flame retardant, and an optional polyfluoroolefin resin.

The inventors have conducted further studies, and have found that high flame retardancy of polycarbonate-based material is developed through a synergistic effect of carbon nanotubes and a flame retardant.

The inventors have also found that, through selection of the structure and purity of carbon nanotubes, electric conductivity can be imparted to a resin by use of carbon in a smaller amount as compared with a conventional technique while moldability and mechanical strength are maintained. Invention 1 has been accomplished on the basis of these findings.

Accordingly, invention 1 is directed to a thermoplastic resin composition comprising 100 parts by mass of a mixture of a thermoplastic resin (A) and carbon nanotubes (B), the mixture being composed of the component (A) in an amount of 80 to 99.95 mass % and the component (B) in an amount of 0.05 to 20 mass %; a flame retardant (C) in an amount of 0.05 to 30 parts by mass; and a polyfluoroolefin resin in an amount of 0 to 2 parts by mass.

The present inventors have also found that an electrically conductive material of high impact strength and imparted with flame retardancy can be produced by blending a thermoplastic resin with carbon nanotubes and at least one compound selected from among a phosphorus compound, a phenolic compound, an epoxy compound, and a sulfur compound.

The inventors have conducted further studies, and have found that high flame retardancy of polycarbonate-based material is developed through a synergistic effect of carbon nanotubes and at least one compound selected from among a phosphorus compound, a phenolic compound, an epoxy compound, and a sulfur compound.

The inventors have also found that, through selection of the structure and purity of carbon nanotubes, electric conductivity can be imparted to a resin by use of carbon in a smaller amount as compared with a conventional technique while moldability and mechanical strength are maintained. Invention 2 has been accomplished on the basis of these findings.

Accordingly, invention 2 is directed to a thermoplastic resin composition comprising 100 parts by mass of a mixture of a thermoplastic resin (A) and carbon nanotubes (B), the mixture being composed of the component (A) in an amount of 80 to 99.9 mass % and the component (B) in an amount of 0.1 to 20 mass %; and at least one compound (flame retardant) (D) selected from among a phosphorus compound (i.e., phosphorus-containing flame retardant), a phenolic compound (i.e., phenolic flame retardant), an epoxy compound (i.e., epoxy-based flame retardant), and a sulfur compound (i.e., sulfur-containing flame retardant), in an amount of 0.005 to 2 parts by mass.

The present inventors have conducted extensive studies in order to solve the aforementioned problems, and have found that an electrically conductive material of high impact strength and imparted with flame retardancy can be produced by blending an aromatic polycarbonate-polyorganosiloxane copolymer with carbon nanotubes, and an optional aromatic polycarbonate resin and/or an optional polytetrafluoroethylene resin.

The inventors have conducted further studies, and have found that polycarbonate resin; specifically an aromatic polycarbonate-polyorganosiloxane copolymer, can be imparted with flame retardancy and, by addition of a small amount of carbon nanotubes, with electric conductivity. The inventors have also found that, through selection of the structure and purity of carbon nanotubes, electric conductivity can be imparted to a resin by use of carbon in a smaller amount as compared with a conventional technique while moldability and mechanical strength are maintained. Invention 3 has been accomplished on the basis of these findings.

Accordingly, invention 3 is directed to a polycarbonate resin composition comprising 100 parts by mass of a mixture of an aromatic polycarbonate-polyorganosiloxane copolymer (A1) having an end group represented by formula (1):

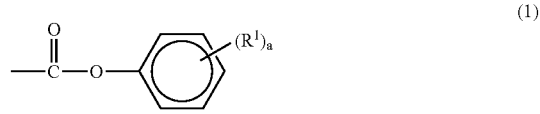

(wherein $R^1$ represents an alkyl group having 10 to 35 of carbon atoms and a is an integer from 0 to 5), an aromatic polycarbonate resin (A2) having an end group represented by formula (2):

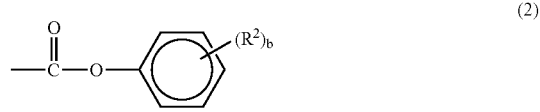

(wherein $R^2$ represents an alkyl group having 1 to 35 of carbon atoms and b is an integer from 0 to 5), and carbon nanotubes (B), the mixture being composed of the component (A1) in an amount of 0.1 to 99.9 mass %, the component (A2) in an amount of 0 to 99.8 mass %, and the component (B) in an amount of 0.1 to 30 mass %; and a polytetrafluoroethylene resin (E) in an amount of 0 to 2 parts by mass.

Collectively, the present invention is directed to the following.

1. A thermoplastic resin composition comprising 100 parts by mass of a mixture of a thermoplastic resin (A) and carbon nanotubes (B), the mixture being composed of the component (A) in an amount of 80 to 99.95 mass % and the component (B) in an amount of 0.05 to 20 mass %; a flame retardant (C) in an amount of 0.05 to 30 parts by mass; and a polyfluoroolefin resin in an amount of 0 to 2 parts by mass.

2. A thermoplastic resin composition comprising 100 parts by mass of a mixture of a thermoplastic resin (A) and carbon nanotubes (B), the mixture being composed of the component (A) in an amount of 80 to 99.9 mass % and the component (B) in an amount of 0.1 to 20 mass %; and at least one compound (flame retardant) (D) selected from among a phosphorus compound (i.e., phosphorus-containing flame retardant), a phenolic compound (i.e., phenolic flame retardant), an epoxy compound (i.e., epoxy-based flame retardant), and a sulfur compound (i.e., sulfur-containing flame retardant), in an amount of 0.005 to 2 parts by mass.

3. A polycarbonate resin composition comprising 100 parts by mass of a mixture of an aromatic polycarbonate-polyorganosiloxane copolymer (A1) having an end group represented by formula (1):

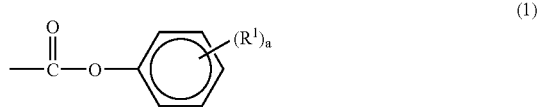

(wherein $R^1$ represents an alkyl group having 1 to 35 of carbon atoms and a is an integer from 0 to 5), an aromatic polycarbonate resin (A2) having an end group represented by formula (2):

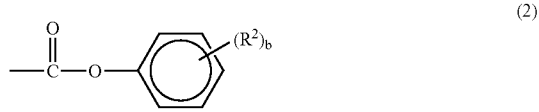

(wherein $R^2$ represents an alkyl group having 1 to 35 of carbon atoms and b is an integer of 0 to 5), and carbon nanotubes (B), the mixture being composed of the component (A1) in an amount of 0.1 to 99.9 mass %, the component (A2) in an amount of 0 to 99.8 mass %, and the component (B) in an amount of 0.1 to 30 mass %; and a polytetrafluoroethylene resin (E) in an amount of 0 to 2 parts by mass.

4. A thermoplastic resin composition as described in (1) above, wherein the thermoplastic resin is a polycarbonate resin.

5. A thermoplastic resin composition as described in (1) above, wherein the thermoplastic resin is a polymer alloy composed of two or more thermoplastic resins.

6. A thermoplastic resin composition as described in (5) above, wherein the polymer alloy is composed of a polycarbonate resin and a styrene resin.

7. A thermoplastic resin composition as described in (1) above, wherein the carbon nanotubes contain amorphous carbon particles in an amount of 20 mass % or less and has a diameter of 0.5 to 120 nm and a length of 500 nm or more.

8. A thermoplastic resin composition as described in (1) above, wherein the carbon nanotubes have open ends.

9. A thermoplastic resin composition as described in (1) above, wherein the flame retardant contains no chlorine atom or bromine atom.

10. A thermoplastic resin composition as described in (1) above, wherein the flame retardant is a phosphorus-containing flame retardant and/or a silicone flame retardant.

11. A molded product of a thermoplastic resin composition as recited in (1) above.

12. A thermoplastic resin composition as described in (2) above, wherein the thermoplastic resin is a polycarbonate resin.

13. A thermoplastic resin composition as described in (2) above, wherein the thermoplastic resin is a polymer alloy composed of two or more thermoplastic resins.

14. A thermoplastic resin composition as described in (13) above, wherein the polymer alloy is composed of a polycarbonate resin and a styrene resin.

15. A thermoplastic resin composition as described in (2) above, wherein the carbon nanotubes contain amorphous carbon particles in an amount of 20 mass % or less and has a diameter of 0.5 to 120 nm and a length of 500 nm or more.

16. A thermoplastic resin composition as described in (2) above, wherein the carbon nanotubes have open ends.

17. A thermoplastic resin composition as described in (2) above, wherein the phosphorus-containing compound is a phosphite ester.

18. A molded product of a thermoplastic resin composition as recited in (2) above.

19. A polycarbonate resin composition as described in (3) above, wherein the aromatic polycarbonate-polyorganosiloxane copolymer has a polyorganosiloxane moiety which is a polydimethylsiloxane (PDMS) skeleton.

20. A polycarbonate resin composition as described in (19) above, which contains polydimethylsiloxane (PDMS) in an amount of 0.1 to 10 mass %.

21. A polycarbonate resin composition as described in (3) above, wherein the aromatic polycarbonate resin has an alkyl group having 10 to 35 of carbon atoms at an end of the molecule.

22. A polycarbonate resin composition as described in (3) above, wherein the carbon nanotubes contain amorphous carbon particles in an amount of 20 mass % or less and has a diameter of 0.5 to 120 nm and a length of 500 nm or more.

23. A polycarbonate resin composition as described in (3) above, wherein the carbon nanotubes have open ends.

24. A molded product of a polycarbonate resin composition as recited in (3) above.

BEST MODES FOR CARRYING OUT THE INVENTION

The present invention will next be described in detail.

Examples of the thermoplastic resin (A) of the thermoplastic resin composition of invention 1 or 2 include polycarbonate resin, styrene resin, polyethylene resin, polypropylene resin, poly(methyl methacrylate) resin, poly(vinyl chloride) resin, cellulose acetate resin, polyamide resin, polyester resins (PET, PBT, etc.), polyacrylonitrile resin, poly(phenylene oxide) resin, polyketone resin, polysulfone resin, poly(phenylene sulfide) resin, a fluorine-containing resin, a silicon-containing resin, polyimide resin, polybenzimidazole resin, and polyamide elastomer.

No particular limitation is imposed on the type of the polycarbonate resin, and any of various polycarbonate resins can be employed.

Generally, an aromatic polycarbonate which is produced through reaction of a dihydric phenol and a carbonate precursor can be employed.

Specifically, an aromatic polycarbonate produced through reaction of a dihydric phenol and a carbonate precursor in a solution or melt manner can be employed. More specifically, an aromatic polycarbonate produced through, for example, transesterification between a dihydric phenol and phosgene, or between a dihydric phenol and diphenyl carbonate can be employed.

A variety of dihydric phenols can be used. Specific examples include 2,2-bis(4-hyroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl) cycloalkane, bis(4-hydroxyphenyl) oxide, bis(4-hydroxyphenyl) sulfide, bis(4-hydroxyphenyl) sulfone, bis(4-hydroxyphenyl) sulfoxide, bis(4-hydroxyphenyl) ether, bis(4-hydroxyphenyl) ketone, and halogen-substituted compounds thereof.

Among them, bis(hydroxyphenyl)alkane compounds are preferred as dihydric phenols, with bisphenol A being particularly preferred as a predominant starting material.

Examples of the carbonate precursor include carbonyl halides, carbonyl esters, and haloformates. Specific examples include phosgene, dihydric phenol dihaloformates, diphenyl carbonate, dimethyl carbonate. and diethyl carbonate.

Examples of other dihydric phenols include hydroquinone, resorcin, and catechol.

These dihydric phenols may be used singly or in combination of two or more species.

Notably, the polycarbonate resin may have a branch structure. Examples of branch-forming agents include 1,1,1-tris(4-hydroxyphenylethane), α,α',α"-tris(4-hydroxyphenyl)-1,3,5-triisopropylbenzene, phloroglucin, trimellitic acid, and isatinbis(o-cresol).

For the purpose of modifying molecular weight, phenol, p-t-butylphenol, p-t-octylphenol, p-cumylphenol, or a similar compound may be used.

The polycarbonate resin employed in invention 1 or 2 may be a copolymer having a polycarbonate moiety and a polyorganosiloxane moiety or a polycarbonate resin including the copolymer.

Alternatively, the polycarbonate resin may be a polyester-polycarbonate resin which is produced through polymerization for forming polycarbonate in the presence of a bi-functional carboxylic acid such as terephthalic acid or an ester precursor such as an ester derivative of the bi-functional carboxylic acid.

Furthermore, a mixture of a variety of polycarbonate resins may also be employed.

The polycarbonate resin employed in invention 1 or 2 preferably has a viscosity average molecular weight of 10,000 to 100,000, particularly preferably 14,000 to 40,000, from the viewpoint of mechanical strength and moldability.

Examples of styrene resins include polymers which are produced through polymerization of a monomer or a monomer mixture containing a monovinyl aromatic monomer such as styrene or α-methylstyrene (20 to 100 wt. %), a cyanovinyl monomer such as acrylonitrile or methacrylonitrile (0 to 60 mass %), and another vinyl monomer such as methyl (meth)acrylate or maleimide which is polymerizable with the above monomers (0 to 50 wt. %).

Specific examples of these polymers include polystyrene (GPPS) and acrylonitrile-styrene copolymers (AS resins).

Alternatively, rubber-modified styrene resin is preferably employed as the styrene resin.

A preferred rubber-modified styrene resin is a high-impact styrene resin formed through graft polymerization of at least a styrenic monomer with rubber.

Examples of rubber-modified styrene resins include a high-impact polystyrene (HIPS) formed through polymerization of rubber such as polybutadiene with styrene; ABS resin formed through polymerization of polybutadiene with acrylonitrile and styrene; and MBS resin formed through polymerization of polybutadiene with methyl methacrylate and styrene. These rubber-modified styrene resins may be used in combination of two or more species, and also used as a mixture with the aforementioned rubber-non-modified styrene resin.

Examples of the aforementioned rubber include polybutediene, rubber polymers containing acrylate and/or methacrylate, styrene-butadiene-styrene rubber (SBS), styrene-butadiene rubber (SBR), butadiene-acryl rubber, isoprene rubber, isoprene-styrene rubber, isoprene-acryl rubber, and ethylene-propylene rubber.

Of these, polybutadiene is particularly preferred.

The polybutadiene employed in the present invention may be a low-cis polybutadiene (e.g., 1,2-vinyl bonding (1 to 30 mol %) and 1,4-cis bonding (30 to 42 mol %)) or a high-cis polybutadiene (e.g., 1,2-vinyl bonding (20 mol % or less) and 1,4-cis bonding (78 mol % or more)). A mixture of these butadienes may also be employed.

Examples of preferred thermoplastic resins include polycarbonate resin, high-impact polystyrene resin, acrylonitrile-styrene resin, methyl methacrylate-styrene resin, acrylonitrile-butadiene-styrene resin, acrylonitrile-ethyelene/propylene-styrene resin, acrylonitrile-n-butyl acrylate-styrene resin, methyl methacrylate-butadiene-styrene resin, and syndiotactic polystyrene resin.

Alternatively, a polymer alloy composed of two or more thermoplastic resins may be employed.

Examples of particularly preferred polymer alloys include polycarbonate resin/acrylonitrile-butadiene-styrene resin, polycarbonate resin/high-impact polystyrene resin, polycarbonate resin/polyester, and polyphenylene oxide resin/high-impact polystyrene resin.

When a polymer alloy is employed, an elastomer may be added to the polymer alloy so as to enhance impact strength.

Examples of preferred elastomers include styrenic or olefinic elastomers such as styrene-(1-butene)-styrene triblock copolymer (SBS) and styrene-(ethylene/1-butene)-styrene triblock copolymer (SEBS); and core-shell type elastomers such as MBS and methyl methacrylate-acrylonitrile-styrene resin (MAS).

According to invention 1, the thermoplastic resin is included in an amount of 80 to 99.95 mass %, preferably 85 to 99.7 mass %.

By regulating the amount to 80 mass % or more, a molded product having good appearance and high conductivity can be produced with maintaining mechanical strength.

However, when the amount is in excess of 99.95 mass %, sufficient conductivity cannot be attained.

According to invention 2, the thermoplastic resin is included in an amount of 80 to 99.9 mass %, preferably 85 to 99.7 mass %.

By regulating the amount to 80 mass % or more, a molded product having good appearance and high conductivity can be produced with maintaining mechanical strength.

However, when the amount is in excess of 99.99 mass %, sufficient conductivity cannot be attained.

The polycarbonate resin composition of invention 3 contains an aromatic polycarbonate-polyorganosiloxane copolymer (A1) represented by formula (1). Examples of the copolymer include those disclosed in Japanese Patent Application Laid-Open (kokai) Nos. 50-29695, 3-292359, 4-202465, 8-81620, 8-302178, and 10-7897. In formula (1), $R^1$, which may be linear or branched, represents an alkyl group having 1 to 35 of carbon atoms. The position of $R^1$ on the benzene ring may be p-, m-, or o-position. Among them, the p-position is preferred.

Examples of preferred aromatic polycarbonate-polyorganosiloxane copolymer include a copolymer having, in the molecule, an aromatic polycarbonate moiety formed of a structural unit represented by formula (3) and a polyorganosiloxane moiety formed of a structural unit represented by formula (4):

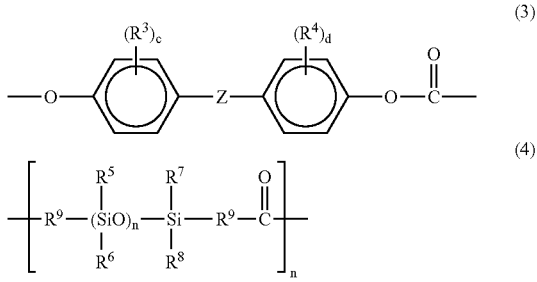

(3)

(4)

wherein each of $R^3$ and $R^4$, which may be identical to or different from each other, represents an alkyl group having 1 to 6 of carbon atoms or a phenyl group;

each of $R^5$ to $R^8$, which may be identical to or different from each other, represents an alkyl group having 1 to 6 of carbon atoms or a phenyl group, with a methyl group being preferred;

$R^9$ represents an aliphatic or an aromatic organic residue, with an o-arylphenol residue, a p-hydroxystyrene residue, and an eugenol residue being preferred;

Z represents a single bond, an alkylene group having 1 to 20 of carbon atoms, an alkylidene group having 1 to 20 of carbon atoms, a cycloalkylene group having 5 to 20 of carbon atoms, a cycloalkylidene group having 5 to 20 of carbon atoms, —$SO_2$—, —SO—, —S—, —O—, or —CO—, with an isopropylidene group being preferred;

each of c and d is an integer of 0 to 4, preferably 0; and n is an integer of 1 to 500, preferably 5 to 200.

The aromatic polycarbonate-polyorganosiloxane copolymer can be produced through, for example, the following procedure. Specifically, an aromatic polycarbonate oligomer (hereinafter abbreviated as PC oligomer) which has been produced in advance and which forms an aromatic polycarbonate moiety and a polyorganosiloxane which has at its end a reactive group such as an o-arylphenol group, a p-hydroxystyrene group, or an eugenol group (reactive PORS) and which forms a polyorganosiloxane moiety are dissolved in a solvent such as methylene chloride, chlorobenzene, or chloroform. To the solution, an aqueous caustic alkali solution of a dihydric phenol and, as a catalyst, a tertiary amine (e.g., triethylamine) a quaternary ammonium salt (e.g., trimethylbenzylammonium chloride) or a similar compound are added. Interfacial polycondensation is performed in the presence of a typical terminating agent composed of a phenol compound represented by formula (5):

(5)

(wherein each of $R^1$ and a has the same meaning as defined above).

Specific examples of the aforementioned terminating agent include phenol, p-cresol, p-tert-butylphenol, p-tert-octylphenol, p-cumylphenol, p-nonylphenol, p-tert-amylphenol, bromophenol, tribromophenol, and pentabromophenol.

Of these, halogen-free compounds are preferred from the viewpoint of environmental issues.

The PC oligomer which is used for producing an aromatic polycarbonate-polyorganosiloxane copolymer can be readily produced by, for example, reacting a carbonate precursor such as phosgene or a carbonate ester compound with a dihydric phenol compound represented by formula (6):

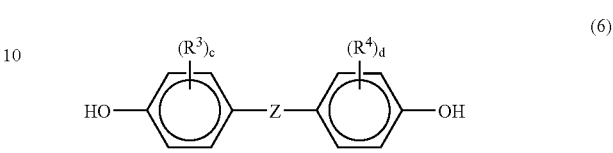

(6)

(wherein $R^3$, $R^4$, Z, c, and d have the same meanings as defined above) in a solvent such as methylene chloride.

Specifically, the PC oligomer can be produced through, for example, reaction between a dihydric phenol and a carbonate precursor such as phosgene, or through transesterification between a dihydric phenol and a carbonate precursor such as diphenyl carbonate, in a solvent such as methylene chloride.

Examples of the dihydric phenol compound represented by formula (6) include 4,4'-dihydroxydiphenyl; bis(4-hydroxyphenyl)alkanes such as 1,1-bis(4-hydroxyphenyl)methane, 1,1-bis(4-hydroxyphenyl)ethane, and 2,2-bis(4-hydroxyphenyl)propane; bis(4-hydroxyphenyl) cycloalkanes; bis(4-hydroxyphenyl) oxide; bis(4-hydroxyphenyl) sulfide; bis(4-hydroxyphenyl) sulfone; bis (4-hydroxyphenyl) sulfoxide; bis(4-hydroxyphenyl) ether; and bis(4-hydroxyphenyl) ketone.

Among them, 2,2-bis(4-hydroxyphenyl)propane (bisphenol A) is preferred.

These dihydric phenols may be used singly or in combination of two or more species.

Examples of the carbonate ester compound include diaryl carbonates such as diphenyl carbonate and dialkyl carbonates such as dimethyl carbonate and diethyl carbonate.

The PC oligomer which is used for producing an aromatic polycarbonate-polyorganosiloxane copolymer may be a homopolymer of one species of the aforementioned dihydric phenols or a copolymer of two or more species of the dihydric phenols.

The PC oligomer may also be a thermoplastic random branched polycarbonate which is produced from any of the aforementioned dihydric phenols and a polyfunctional aromatic compound.

In the above case, a branching agent (polyfunctional aromatic compound) such as 1,1,1-tris(4-hydroxyphenyl) ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxylphenyl)ethyl]benzene, phloroglucine, trimellitic acid, or isatinbis(o-cresol) can be employed.

The aromatic polycarbonate-polyorganosiloxane copolymer serving as component (A1) can be produced in the aforementioned manner. However, an aromatic polycarbonate is generally by-produced. Thus, an aromatic polycarbonate resin containing the aromatic polycarbonate-polyorganosiloxane copolymer is produced. The viscosity average molecular weight of the polycarbonate resin is preferably 10,000 to 40,000, more preferably 12,000 to 30,000.

The amount of polyorganosiloxane in the polycarbonate resin containing component (A1) is preferably 0.5 to 10 mass % based on the entirety of the polycarbonate resin.

The polymer produced through the aforementioned method virtually has, at one end or both ends of the molecule, an end group represented by formula (1).

The polycarbonate resin composition of the present invention contains the aromatic polycarbonate-polyorganosiloxane copolymer represented by formula (1) in an amount of 0.1 to 99.9 mass %.

When the amount is adjusted to 0.1 mass % or more, flame retardancy and dispersibility of carbon nanotubes are enhanced, leading to increase in conductivity.

When the amount is adjusted to 99.9 mass % or less, sufficient heat resistance, toughness, and compatibility with an aromatic polycarbonate resin having an end group represented by formula (2) upon blending can be attained.

The aromatic polycarbonate-polyorganosiloxane copolymer contains an polyorganosiloxane in an amount of 0.1 to 10 mass %, preferably 0.3 to 5 mass %.

When the amount of polyorganosiloxane is adjusted to 0.1 mass % or more, flame retardancy and impact resistance are enhanced.

When the amount of polyorganosiloxane is adjusted to 10 mass % or less, heat resistance and flame retardancy are enhanced.

Among polyorganosiloxanes, polydimethylsiloxane (PDMS) is particularly preferred.

The aromatic polycarbonate resin (A2) represented by formula (2) contained in the polycarbonate resin composition of invention 3 preferably has a viscosity average molecular weight of 10,000 to 40,000, more preferably 12,000 to 30,000.

In formula (2), $R^2$ is an alkyl group having 1 to 35 of carbon atoms and may be a straight chain or a branched chain.

The position of $R^2$ bonded to the benzene ring may be p-, m-, or o-position. Of these, p-position is preferred.

The aromatic polycarbonate resin represented by formula (2) can be readily produced by reacting a dihydric phenol with phosgene or a carbonate ester compound.

Specifically, the polycarbonate resin can be produced through, for example, reaction between a dihydric phenol and a carbonate precursor such as phosgene in the presence of a catalyst such as an amine and a specific terminating agent, or transesterification between a dihydric phenol and a carbonate precursor such as diphenyl carbonate, in a solvent such as methylene chloride.

The dihydric phenol may be a compound identical to or different from the compound represented by the aforementioned formula (6).

The polycarbonate resin may be a homopolymer of one species of the aforementioned dihydric phenols or a copolymer of two or more species of the dihydric phenols.

The polycarbonate resin may also be a thermoplastic random branched polycarbonate which is produced from any of the aforementioned dihydric phenols and a polyfunctional aromatic compound.

Examples of the carbonate ester compound include diaryl carbonates such as diphenyl carbonate and dialkyl carbonates such as dimethyl carbonate and diethyl carbonate.

As a terminating agent, a phenol compound forming an end group represented by formula (2) can be used.

Specifically, the phenol compound is represented by formula (7):

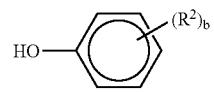

wherein $R^2$ has the same meaning as defined above.

Examples of the alkylphenol compound include phenol, p-cresol, p-tert-butylphenol, p-tert-octylphenol, p-cumylphenol, p-nonylphenol, docosylphenol, tetracosylphenol, hexacosylphenol, octacosylphenol, triacontylphenol, dotriacontylphenol, and tetratriacontylphenol.

These alkylphenols may be used singly or in combination of two or more species.

In addition to these alkylphenols, another phenol compound or a similar compound may also be used so long as the effect of the present invention is not impaired.

The aromatic polycarbonate produced through the aforementioned method virtually has, at one end or both ends of the molecule, an end group represented by formula (2).

The polycarbonate resin composition of invention 3 contains the aromatic polycarbonate resin represented by formula (2) in an amount of 0 to 99.8 mass %.

Incorporation of the aromatic polycarbonate resin enhances heat resistance and impact resistance.

When the amount of the aromatic polycarbonate resin is adjusted to 99.8 mass % or less, sufficient flame retardancy can be attained.

In order to attain high fluidity, the aromatic polycarbonate resin preferably has, at its end(s), an alkyl group having 10 to 35 of carbon atoms.

When the end group is an alkyl group having not less than 10 of carbon atoms, fluidity of the polycarbonate resin composition is enhanced.

However, when the end group is an alkyl group having more than 35 of carbon atoms, heat resistance and impact resistance are reduced.

The carbon nanotubes (B) contained in the resin compositions of inventions 1 to 3 are formed of a hollow cylindrical fiber carbon substance having an outer diameter of 0.5 to 120 nm and a length of 500 nm or more. Preferably, the outer diameter is 1 to 100 nm and the length is 800 to 15,000 nm.

When the outer diameter of the carbon nanotubes is less than 0.5 nm, dispersibility thereof is poor, thereby decreasing conductivity.

When the outer diameter is in excess of 120 nm, appearance of molded products of the resin compositions is poor, and conductivity decreases.

When the length of the carbon nanotubes is less than 800 nm, conductivity is poor.

When the length is in excess of 15,000 nm, appearance of molded products of the resin compositions is poor, and dispersion thereof in the composition is difficult.

From the viewpoint of conductivity and flame retardancy, the resin compositions of inventions 1 to 3 preferably contain amorphous carbon particles impurities included in carbon nanotubes in an amount of 20 mass % or less.

By controlling the amorphous carbon particle content is 20 mass % or less, electric conduction performance is enhanced, and thermal deterioration of a resin during molding can be prevented.

The resin composition of invention 1 contains carbon nanotubes in an amount of 0.05 to 20 mass %, preferably 0.3 to 15 mass %.

When the amount is adjusted to 0.05 mass % or more, conductivity and flame retardancy of the thermoplastic resin composition are enhanced, whereas when the amount is adjusted to 20 mass % or less, performance of the resin composition is enhanced commensurate with the amount of carbon nanotubes, and impact strength and moldability are enhanced.

The resin composition of invention 2 contains carbon nanotubes in an amount of 0.1 to 20 mass %, preferably 0.3 to 15 mass %.

When the amount is adjusted to 0.1 mass % or more, conductivity and flame retardancy of the thermoplastic resin composition are enhanced, whereas when the amount is adjusted to 20 mass % or less, performance of the resin composition is enhanced commensurate with the amount of carbon nanotubes, and impact strength and moldability are enhanced.

The resin composition of invention 3 contains carbon nanotubes in an amount of 0.1 to 30 mass %, preferably 0.1 to 15 mass %.

When the amount is adjusted to 0.1 mass % or more, conductivity and flame retardancy of the polycarbonate resin composition are enhanced, whereas when the amount is adjusted to 30 mass % or less, performance of the resin composition is enhanced commensurate with the amount of carbon nanotubes, and impact strength and moldability are enhanced.

In the present invention, a variety of known carbon nanotubes and carbon micro-coils can be employed as the carbon nanotubes.

The carbon nanotubes can be produced through catalytic chemical vapor deposition (CCVD), which employs an iron or cobalt catalyst charged in micropores of zeolite, chemical vapor deposition (CVD), laser ablation, arc discharge, which employs carbon rods/carbon fibers, or a similar method.

The ends of the carbon nanotubes are not necessarily cylindrical, and may be in the form of a deformed cylinder such as a cone.

The carbon nanotubes used in the present invention may closed ends or open ends. Preferably, the carbon nanotubes have open ends.

The closed ends of carbon nanotubes can be opened through chemical treatment with nitric acid or a similar substance.

Furthermore, the carbon nanotubes may have a multi-layer or a single layer structure.

No particular limitation is imposed on the flame retardant (C) contained in the thermoplastic resin composition of invention 1, and a known flame retardant such as an organic phosphorus compound, a halogen-free phosphorus compound, a silicone compound, a halogen compounds, an organic alkali metal salt, an organic alkaline earth metal salt, a nitrogen-containing compound, a metal hydroxide, red phosphorus, antimony oxide, or expandable graphite can be employed in accordance with the purpose.

Examples of the halogen compound include tetrabromobisphenol A, halogenated polycarbonate, halogenated polycarbonate (co)polymer and oligomer thereof, decabromodiphenyl ehter, (tetrabromobisphenol) epoxy oligomers, halogenated polystyrene, and halogenated polyolefins.

Examples of the nitrogen-containing compound include melamine and melamine substituted by an alkyl group or an aromatic group. Examples of the metal hydroxide include magnesium hydroxide and aluminum hydroxide.

However, halogen-containing flame retardants, which exhibit comparatively high flame retardant efficiency, have possibilities of generation of harmful gas during molding, corrosion to a metal mold, and discharging harmful gas during burning of molded products. Thus, a halogen-free flame retardant is preferable from the viewpoint of environmental pollution and safety.

Examples of the halogen-free flame retardant include a halogen-free organic phosphorus-containing flame retardant.

No particular limitation is imposed on the halogen-free organic phosphorus-containing flame retardant, and any organic compound can be used so long as the compound contains a phosphorus atom and no halogen atoms.

Among such compounds, a phosphate ester compound containing at least one ester oxygen atom which is directly bonded to a phosphorus atom is preferably employed.

Example of halogen-free flame retardants other than organic phosphorus compounds include red phosphorus and silicone flame retardants such as silicone oil and silicone resin.

Examples of the silicone flame retardants include silicone compounds of a specific structure having a reactive group such as an alkoxy group or an epoxy group and silicone resins having a specific molecular weight and repeating units having different oxygen contents (see, for example, Japanese Patent Application Laid-Open (kokai) Nos. 6-306265, 6-336547, 8-176425, and 10-139964).

Among non-halogen flame retardants, a silicone compound, a phosphate ester compound, or red phosphorus (red phosphorus surface-treated with an organic compound, an inorganic compound, etc.) is preferably employed.

Among a variety of silicone compounds, silicone compounds having a functional group are preferred. Examples include functional-group-containing (poly)organosiloxanes (polymer and copolymer) having as a skeleton a basic structure represented by the following formula:

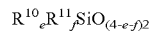

$$R^{10}{}_{e}R^{11}{}_{f}SiO_{(4-e-f)/2}$$

(wherein $R^{10}$ is a group having a function group, $R^{11}$ represents a hydrocarbon group having 1 to 12 of carbon atoms, and e and f satisfy $0<e\leq 3$, $0\leq f<3$, and $0<e+f\leq 3$).

Examples of the functional group include an alkoxy group, an aryloxy group, a polyoxyalkylene group, a hydrogen group, a hydroxyl group, a carboxyl group, a silanol group, an amino group, a mercapto group, and an epoxy group.

A silicone compound having a plurality of functional groups and a silicone compound having functional groups different from one another may be used in combination.

The silicone compound containing such a functional group generally has a functional group ($R^{10}$)/hydrocarbon group ($R^{11}$) ratio of about 0.1 to about 3, preferably about 0.3 to about 2.

These silicone compounds are in the form of liquid, powder, etc. Of these, those exhibiting high dispersibility during melt kneading are preferred.

For example, liquid-type silicone compounds having a viscosity at room temperature of about 10 to about 500,000 cSt (centi stokes) are preferred.

In the case in which the silicone compound has a functional group, even when the silicone compound is in the liquid form, the compound is homogeneously dispersed in the composition, and generates less bleed on the molded product surface or during molding.

No particular limitation is imposed on the phosphate ester compounds, and those having no halogen are preferred. Examples include phosphate ester compounds represented by formula (8):

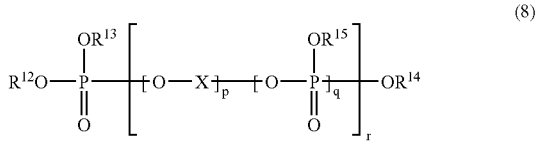

wherein each of $R^{12}$, $R^{13}$, $R^{14}$, and $R^{15}$ represents a hydrogen atom or an organic group, X represents an organic group having a valence of 2 or more, p is 0 or 1, q is an integer of 1 or more, and r is an integer of 0 or more).

In formula (8), the organic group represents an alkyl group, a cycloalkyl group, or an aryl group. These groups may or may not be substituted.

Examples of the substituent of substituted organic groups include an alkyl group, an alkoxy group, an aryl group, an aryloxy group, and an arylthio group.

Examples further include an arylalkoxyalkyl group formed through combination of these substituents and an arylsulfonylaryl group formed through combination of these substituents by the mediation of an oxygen atom, a nitrogen atom, a sulfur atom, etc.

In formula (8), the organic group (X) having a valence of 2 or more refers to a group having a valence of 2 or more which group is formed from the above organic groups by removing at least one hydrogen atoms bonded to a carbon atom.

Examples include an alkylene group, a (substituted) phenylene group, and a group derived from a bisphenol (polynucleus phenol).

Examples preferred phenols include bisphenol A, hydroquinone, resorcinol, diphenylmethane, dihydroxydiphenyl, and dihydroxynaphthalene.

These phosphate ester compounds may be a monomer, a dimer, an oligomer, a polymer, or a mixture thereof.

Examples include trimethyl phosphate, triethyl phosphate, tributyl phosphate, trioctyl phosphate, tributoxyethyl phosphate, triphenyl phosphate, tricresyl phosphate, cresyl diphenyl phosphate, octyl diphenyl phosphate, tri(2-ethylhexyl) phosphate, diisopropyl phenyl phosphate, trixylenyl phosphate, tris(isopropylphenyl) phosphate, trinaphthyl phosphate, bisphenol A bisphosphate, hydroquinone bisphosphate, resorcin bisphosphate, resorcinol-diphenyl phosphate, trioxybenzene triphosphate, cresyl diphenyl phosphate, substituted products thereof, and condensation products thereof.

Examples of commercially available halogen-free phosphate ester compounds include commercial products of Daihachi Chemical Industry Co., Ltd.; e.g., TPP (triphenyl phosphate), TXP (trixylenyl phosphate), PFR (resorcinol (diphenylphosphate)), CR-733S (resorcinol bis(diphenylphosphate)), CR-741 (bisphenol A bisdiphenylphosphate), PX 200 (1,3-phenylene-tetrakis(2,6-dimethylphenyl) phosphoate ester), PX 201 (1,4-phenylene-tetrakis(2,6-dimethylphenyl)phosphate ester), and PX 202 (4,4'-biphenylene-tetrakis(2,6-dimethylphenyl)phosphate ester).

A variety of organic alkali metal salts and alkaline earth metal salts can be employed so long as the acid source of these salts is an organic acid or an organic acid ester having at least one carbon atom.

Examples of the organic acid and the organic acid ester include organic sulfonic acids and organic carboxylic acids.

Examples of the alkali metal include sodium, potassium, lithium, and cesium. Examples of the alkaline earth metal include magnesium, calcium, strontium, and barium. Of these, salts of sodium, potassium, or cesium are preferred.

These organic acid salts may be substituted by a halogen such as fluorine, chlorine, or bromine.

Among the aforementioned organic alkali metal salts and alkaline earth metal salts, examples of organic sulfonic acid salts which are preferably employed include alkali metal salts and alkaline earth metal salts of a perfluoroalkanesulfonic acid represented by the following formula (9):

(wherein k is an integer of 1 to 10, M represents an alkali metal such as lithium, sodium, potassium, or cesium or an alkaline earth metal such as magnesium, calcium, strontium, or barium, and m represents a valence of M).

These compounds are described in Japanese Patent Publication (kokoku) No. 47-40445.

Examples of the perfluoroalkanesulfonic acid contained in formula (9) include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, and perfluorooctanesulfonic acid.

Of these, potassium salts thereof are preferably employed.

Other than the above salts, examples further include alkali metal salts and alkaline earth metal salts of an organic sulfonic acid such as 2,5-dichlorobenzenesulfonic acid; 2,4,5-trichlorobenzenesulfonic acid; diphenylsulfone-3-sulfonic acid; diphenylsulfone-3,3'-disulfonic acid; or naphthalenetrisulfonic acid.

In addition, sodium polystyrenesulfate (PSS-Na) or a similar salt can also be employed.

Examples of the organic carboxylic acid include perfluoroformic acid, perfluoromethanecarboxylic acid, perfluoroethanecarboxylic acid, perfluoropropanecarboxylic acid, perfluorobutanecarboxylic acid, perfluoromethylbutanecarboxylic acid, perfluorohexanecarboxylic acid, perfluoroheptanecarboxylic acid, and perfluorooctanecarboxylic acid. Alkali metal salts and alkaline earth metal salts of these organic carboxylic acid can be employed. Herein, the alkali metal and the alkaline earth metal are the same as defined above.

The composition of invention 1 contains a flame retardant in an amount of 0.05 to 30 parts by mass, preferably 0.1 to 15 parts by mass, based on 100 parts by mass (total amount) of a mixture of a thermoplastic resin (A) and carbon nanotubes (B).

When the amount of the flame retardant is less than 0.05 parts by mass, the target inflammability (V–0) cannot be attained.

When the amount is in excess of 30 parts by mass, physical properties such as impact strength are deteriorated.

In the thermoplastic resin composition of invention 1, the polyfluoroolefin resin (C) is employed in order to prevent dripping of a resin melt during firing such as in an inflammability test.

The polyfluoroolefin resin employed in the composition is a polymer or a copolymer generally having a fluoroethylene structure. Examples include difluoroethylene polymer, tetrafluoroethylene polymer, tetrafluoroethylene-hexafluoropropylene copolymer, and a copolymer of tetrafluoroethylene and a fluorine-free ethylenic monomer.

Of these, polytetrafluoroethylene (PTFE) is preferred. The polyfluoroolefin resin preferably has an average molecular weight of 500,000 or more, particularly preferably 500,000 to 10,000,000.

All polytetrafluoroethylene species that have heretofore been known can be employed in the composition of invention 1.

Among polytetrafluoroethylenes, use of those having fibril formability imparts higher melt dripping prevention effect to the resin composition.

No particular limitation is imposed on the polytetrafluoroethylene (PTFE) species having fibril formability, and for example, those classified to Type 3 in the ASTM standards can be employed.

Specific examples include Teflon 6-J (product of Du pont-Mitsui Fluorochemicals Company), Polyflon D-1, Polyflon F-103, Polyflon F201 (products of Daikin Industries), and CD 076 (product of Asahi Glass Fluoropolymers).

Other than the species classified to Type 3, examples include Algoflon F5 (product of Montefluos) and Polyflon MPA and Polyflon FA-100 (products of Daikin Industries).

These polytetrafluoroethylene (PTFE) species may be used singly or in combination of two or more species.

The aforementioned polytetrafluoroethylene (PTFE) having fibril formability can be produced through, for example, polymerization of tetrafluoroethylene in an aqueous solvent in the presence of sodium, potassium, or ammonium peroxydisulfide at 6.9 to 689.5 kPa and 0 to 200° C. (preferably 20 to 100° C.)

The resin composition contains a polyfluoroolefin resin in an amount of 0 to 2 parts by mass, preferably 0.05 to 1 part by mass, based on 100 parts by mass (total amount) of a mixture of a thermoplastic resin (A) and carbon nanotubes (B).

When the amount of polyfluoroolefin resin is adjusted to 0.05 parts by mass or more, melt dripping prevention at the target inflammability can be sufficiently attained.

When the amount is adjusted to 2 parts by mass or less, the effect commensurate with the amount of the resin added can be attained, which is suitable for impact resistance and appearance of molded products.

Thus, the amount of polyfluoroolefin resin can be appropriately determined in accordance with the inflammability required for a target molded product, the thickness of the molded product, or other factors.

Examples of the phosphorus compound (i.e., phosphorus-containing flame retardant) contained in the thermoplastic resin composition of invention 2 include phosphoric acid esters, phosphorous acid esters, phosphonic acid esters, and phosphines.

Examples of the phosphate ester compounds include those mentioned in relation to invention 1.

Examples of phosphite esters include an ester represented by formula (10):

(10)

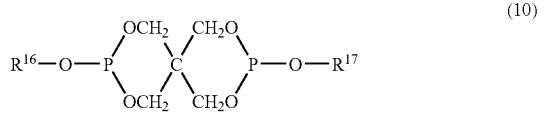

(wherein each of $R^{16}$ and $R^{17}$ represents hydrogen, an alkyl group, a cycloalkyl group, or an aryl group, the cycloalkyl group and the aryl group being optionally substituted by an alkyl group).

Specific examples of phosphite esters include compounds represented by formula (11) [Adeka Stab PEP-36, product of Asahi Denka Co., Ltd.]:

(11)

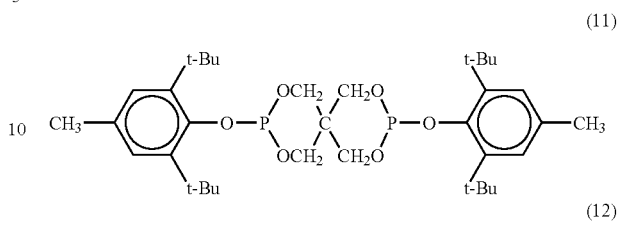

formula (12):

(12)

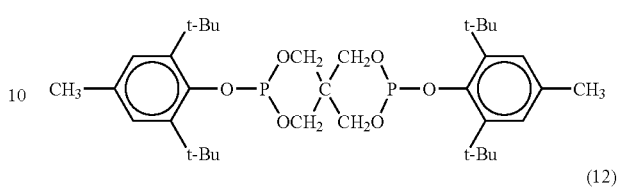

formula (13):

(13)

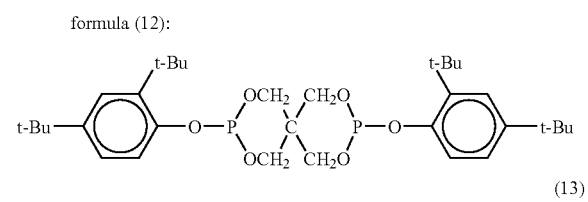

formula (14):

(14)

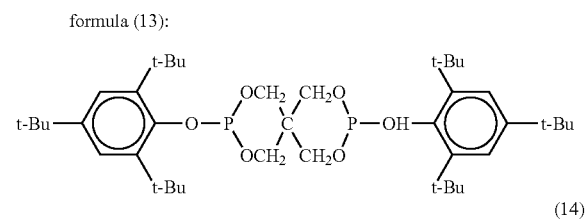

and formula (15):

(15)

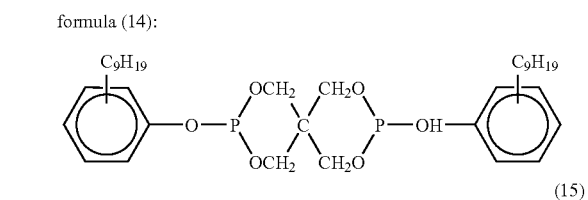

Examples of phosphite esters other than the above-exemplified include compounds represented by formula (16):

(16)

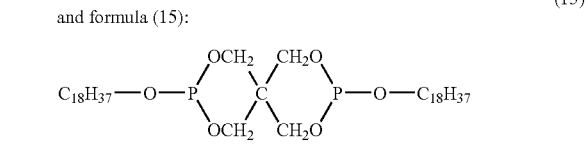

formula (17):

(17)

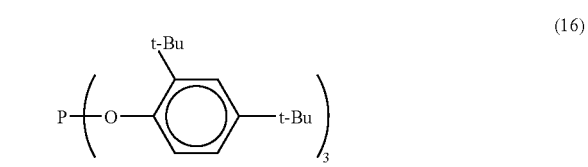

formula (18):

(18)

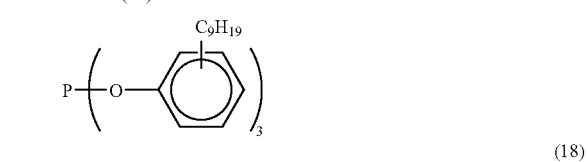

-continued formula (19):

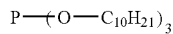

and formula (20).

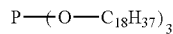

A variety of phenolic compounds (i.e., phenolic flame retardants) can be employed in the thermoplastic resin composition of invention 2. Specific examples include compounds represented by formula (21) [Irganox 1076, product of by Ciba Specialty]:

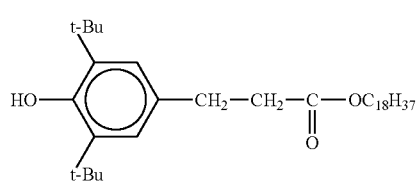

and formula (22).

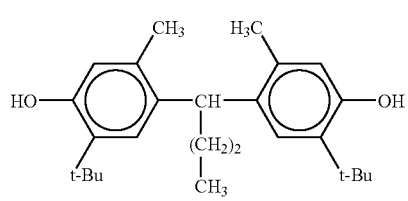

The epoxy compound (i.e., epoxy-based flame retardant) contained in the thermoplastic resin composition of invention 2 is a compound which has at least one epoxy group in the molecule and which preferably contains no halogen atom.

Specific examples include alicyclic epoxy compounds such as epoxylated soybean oil, epoxylated linseed oil, epoxylated butyl stearate, epoxylated octyl stearate, phenyl glycidyl ether, allyl glycidyl ether, p-butylphenyl glycidyl ether, styrene oxide, neohexene oxide, diglycidyl adipate, diglycidyl sebacate, diglycidyl phathalate, bis-epoxylated dicyclopentadienyl ether, ethylene glycol diglycidyl ether, propylene glycol diglycidyl ether, polyethylene glycol diglycidyl ether, butadiene diepoxide, tetraphenylethylene epoxide, epoxylated polybutadiene, epoxylated styrene-butadiene copolymer, epoxylated hydrogenated styrene-butadiene copolymer, bisphenol A epoxy compounds, bisphenol S epoxy compounds, phenol-novolak epoxy compounds, resorcinol epoxy compounds, 3,4-epoxycyclohex-amethyl-3,4-epoxycyclohexyl carboxylate (2021P, product of Daicel Chemical), and 3,4-epoxycyclohexyl glycidyl ether.

These epoxy compounds may be used singly or in combination of two or more species.

No particular limitation is imposed on the sulfur compound (i.e., sulfur-containing flame retardant) contained in the thermoplastic resin composition of invention 2. Specific examples include dilauryl 3,3'-thiodipropionate, ditridecyl 3,3'-thiodipropionate, dimyristyl 3,3'-thiodipropionate, distearyl 3,3'-thiodipropionate, distearyl 3,3'-methyl-3,3'-thiodipropionate, bis[2-methyl-4-(3-n-alkyl(C12 or C14)thiopropionyloxy)-5-t-butylphenyl] sulfide, tetrakis[methylene-3-(hexylthio)propionato]methane, tetrakis[methylene-3-(dodecylthio)propionato]methane, tetrakis[methylene-3-(octadecylthio)propionato]methane, 2,2-thio-diethylene bis [3-(3,5-di-t-butyl-4-hydroxyphenyl)propionate], 4,4'-thiobis (3-methyl-6-t-butylphenol), 2-mercaptobenzimidazole, and 2-mercaptomethylbenzimidazole.

The thermoplastic resin composition contains at least one compound selected from among a phosphorus compound, a phenolic compound, an epoxy compound, and a sulfur compound in an amount of 0.005 to 2 parts by mass, preferably 0.01 to 1 part by mass, based on 100 parts by mass of a mixture of a thermoplastic resin (A) and carbon nanotubes (B).

When the amount is less than 0.005 parts by mass, the target inflammability (V-0) cannot be attained.

When the amount is in excess of 2 parts by mass, physical properties such as impact strength are deteriorated.

The polytetrafluoroethylene resin (E) contained in the thermoplastic resin composition of invention 3 is polytetrafluoroethylene (hereinafter abbreviated as PTFE) which has fibril formability and an average molecular weight of 500,000 or more. The PTFE has melt dripping prevention effect and imparts high flame retardancy to the resin composition.

The polytetrafluoroethylene resin essentially has an average molecular weight of 500,000 or more, preferably 500,000 to 10,000,000, more preferably 1,000,000 to 10,000,000.

No particular limitation is imposed on the PTFE having fibril formability. Specific examples include Teflon 6-J (product of Du pont-Mitsui Fluorochemicals Company), Polyflon D-1, Polyflon F-103, Polyflon F201, Polyflon MPA, and FA-100 (products of Daikin Industries), CD 076 (product of Asahi Glass Fluoropolymers), and Algoflon F5 (product of Montefluos).

The aforementioned PTFE having fibril formability can be produced through, for example, polymerization of tetrafluoroethylene in an aqueous solvent in the presence of sodium, potassium, or ammonium peroxydisulfide at 7 to 700 kPa and 0 to 200° C. (preferably 20 to 100° C.).

The resin composition contains a PTFE in an amount of 0 to 2 parts by mass, preferably 0.05 to 1 part by mass, based on 100 parts by mass (total amount) of components (A1), (A2), and (B).

Through incorporation of PTFE into the resin composition, melt dripping prevention at the target inflammability can be sufficiently attained.

When the PTFE content is in excess of 2 parts by mass, impact resistance decreases and appearance of molded products is deteriorated.

Thus, the amount of PTFE can be appropriately determined in accordance with the inflammability required for a target molded product and the thickness of the molded product.

The present invention will next be described in more detail by way of Examples, which should not be construed as limiting the invention thereto.

[Performance Evaluation Method]

(1) Izod (Izod impact strength): in accordance with ATM D256, 23° C. (thickness: ⅛ inches), unit: kJ/m²

(2) Flexural modulus: in accordance with ASTM D-790 (test conditions: 23° C., 4 mm), unit: MPa (3) Volume resistivity: in accordance with JIS K6911 (test plate: 80×80×3 mm)

(4) Flame retardancy: in accordance with UL94 combustion test (test piece thickness: 1.5 mm, 3.0 mm)

(5) Melt index (MI): in accordance with JIS K7210 (300° C., load: 1.2 kg)

EXAMPLES 1 TO 5 AND COMPARATIVE EXAMPLES 1 TO 5

In each Example or Comparative Example, components were mixed in the corresponding proportions shown in Table 1 or 2 [N.B., components (A) and (B); based on mass %, components (C1) and (C2): based on parts by mass with respect to 100 parts by mass of the resin composed of components (A) and (B)], and the resultant mixture was fed to a vent-type twin screw extruder (TEM35, product of Toshiba Machine). The mixture was melt-kneaded at 280° C., to thereby form pellets.

In all Examples and Comparative Examples, a phosphorus-containing antioxidant PEP 36 (0.1 parts by mass) serving as a stabilizer was incorporated into the mixture.

The thus-produced pellets were dried at 120° C. for 10 hours and then injection-molded at 280° C. (mold temperature: 80° C.), to thereby produce test pieces.

The thus-obtained test pieces were evaluated in terms of performance through the aforementioned tests. The results are shown in Tables 1 and 2.

The components employed for producing the mixtures are as follows.

[Components]

(A) Polycarbonate resin PC: FN1900A (product of Idemitsu Petrochemical), viscosity average molecular weight=19,500, and acrylonitrile-butadiene-styrene resin (ABS): AT-05 (product of A&L)

(B) Carbon nanotube 2: multi-wall, diameter=10 to 30 nm, length=1,000 to 10,000 nm, both ends opened, amorphous carbon particle content of 15 mass % (product of Sun Nanotech), and carbon nanotube 2: multi-wall, diameter=50 to 100 nm, length=1,000 to 10,000 nm, both ends opened, amorphous carbon particle content of 15 mass % (product of Sun Nanotech)

(C1) Phosphate ester: bisphenol A bis(diphenyl) phosphate (CR741, product of Daihachi Chemical Industry), metal salt: sodium polystyrenesulfonate (PSS-Na, product of Lion), silicone: methylphenylsilicone having a vinyl group and a methoxy group (KR219, product of Shin-Etsu chemical), viscosity=18 cSt, and TBA oligomer (tetrabromobisphenol A oligomer): FG7500 (product of Teijin Chemicals Ltd.)

(C2) PTFE: CD076 (product of Asahi Glass Fluoropolymers)

The test results shown in Tables 1 and 2 indicate the following.

1. As the amount of carbon nanotubes (B) increases, conductivity increases. Elastic modulus is enhanced by increasing the diameter of component (B).

2. Although sole incorporation of component (B) or flame retardant (C) attains poor flame retardancy, incorporation of component (B) and flame retardant (C) in combination attains excellent flame retardancy.

TABLE 1

| | | | Ex. 1 | Ex. 2 | Ex. 3 | Ex. 4 | Ex. 5 |
|---|---|---|---|---|---|---|---|
| Formulation | (A) | PC | 97 | 97 | 99.5 | 70 | 50 |
| | | ABS | — | — | — | 20 | 40 |
| | (B) | Carbon nanotube 1 | 3 | — | 0.5 | — | 10 |
| | | Carbon nanotube 2 | — | 3 | — | 10 | — |
| | (C1) | Phosphate ester | — | — | — | 10 | — |
| | | Metal salt | — | — | 0.1 | — | — |
| | | Silicone | 1 | 1 | — | — | — |
| | | TBA oligomer | — | — | — | — | 10 |
| | (C2) | PTFE | — | — | — | 0.1 | 0.3 |
| Evaluation | | Izod impact strength kJ/m$^2$ | 75 | 75 | 85 | 55 | 40 |
| | | Flexural modulus MPa | 2400 | 2800 | 2100 | 3700 | 3200 |
| | | Volume resistivity | 1 × 10E2 | 3 × 10E3 | 2 × 10E11 | 1.2 | 4 × 10E2 |
| | | Flame retardancy 1.5 mm | V-0 | V-0 | V-0 | V-0 | V-0 |

TABLE 2

| | | | Comp. Ex. 1 | Comp. Ex. 2 | Comp. Ex. 3 | Comp. Ex. 4 | Comp. Ex. 5 |
|---|---|---|---|---|---|---|---|
| Formulation | (A) | PC | 97 | 100 | 99.5 | 99.5 | 70 |
| | | ABS | — | — | — | — | 20 |
| | (B) | Carbon nanotube 1 | 3 | — | 0.5 | — | — |
| | | Carbon nanotube 2 | — | — | — | — | 10 |
| | (C1) | Phosphate ester | — | — | — | — | — |
| | | Metal salt | — | — | — | 0.1 | — |
| | | Silicone | — | 1 | — | — | — |
| | | Bromine | — | — | — | — | — |
| | (C2) | PTFE | — | — | — | — | 0.1 |
| Evaluation | | Izod impact strength kJ/m$^2$ | 75 | 80 | 85 | 85 | 55 |

TABLE 2-continued

|  | Comp. Ex. 1 | Comp. Ex. 2 | Comp. Ex. 3 | Comp. Ex. 4 | Comp. Ex. 5 |
|---|---|---|---|---|---|
| Flexural modulus MPa | 2400 | 2100 | 2100 | 2100 | 3300 |
| Volume resistivity | 2 × 10E3 | >10E16 | 2 × 10E13 | >10E16 | 0.5 |
| Flame retardancy 1.5 mm | V-2 | V-2 | V-2 | V-2 | NG |

EXAMPLES 6 TO 11 AND COMPARATIVE EXAMPLES 6 TO 10

In each Example or Comparative Example, components were mixed in the corresponding proportions shown in Table 3 or 4 [N.B., components (A) and (B); based on mass %, component (D): based on parts by mass with respect to 100 parts by mass of the resin composed of components (A) and (B)], and the resultant mixture was fed to a vent-type twin screw extruder (TEM35, product of Toshiba Machine). The mixture was melt-kneaded at 280° C., to thereby form pellets.

The thus-produced pellets were dried at 120° C. for 10 hours and then injection-molded at 280° C. (mold temperature: 80° C.), to thereby produce test pieces.

The thus-obtained test pieces were evaluated in terms of performance through the aforementioned tests. The results are shown in Tables 3 and 4.

The components employed for producing the mixtures are as follows.

[Components]

(A) Polycarbonate resin PC: FN1900A (product of Idemitsu Petrochemical), viscosity average molecular weight=19,500, and acrylonitrile-butadiene-styrene resin (ABS): AT-05 (product of A&L)

(B) Carbon nanotube 1: multi-wall, diameter=10 to 30 nm, length=1 to 10 μm, both ends opened, amorphous carbon particle content of 15 mass % (product of Sun Nanotech), and carbon nanotube 2: multi-wall, diameter=50 to 100 nm, length=1 to 10 μm, both ends opened, amorphous carbon particle content of 15 mass % (product of Sun Nanotech)

(D) Phosphorous compound 1: Adeka Stab PEP36 [product of Asahi Denka Co., Ltd.], phosphorous compound 2: P-EPQ (product of Clariant), phenolic compound: Irganox 1076 (product of Ciba Specialty), epoxy compound: 2021P (product of Daicel Chemical), and sulfur compound: AO 412S [product of Asahi Denka Co., Ltd.]

The test results shown in Tables 3 and 4 indicate the following.

1. Sole incorporation of polycarbonate resin (A) attains poor flame retardancy and conductivity.

2. As the amount of carbon nanotubes (B) increases, conductivity and elastic modulus increase. Elastic modulus is also enhanced by increasing the diameter of component (B).

3. When no component (C) is incorporated into the composition, flame retardancy and conductivity are poor, and silver streaks are generated on the molded products. However, incorporation of an excessive amount of component (C) reduces impact strength.

TABLE 3

|  |  | Ex. 6 | Ex. 7 | Ex. 8 | Ex. 9 | Ex. 10 | Ex. 11 |
|---|---|---|---|---|---|---|---|
| Formulation | (A) PC | 99.5 | 97 | 97 | 90 | 87 | 50 |
|  | ABS | 0 | 0 | 0 | 0 | 10 | 40 |
|  | (B) Carbon nanotube 1 | 0.5 | 3 | 0 | 0 | 3 | 10 |
|  | Carbon nanotube 2 | 0 | 0 | 3 | 10 | 0 | 0 |
|  | (D) Phosphorous compound 1 | 0 | 0.3 | 0.1 | 0 | 0.02 | 0 |
|  | Phosphorous compound 2 | 0.1 | 0 | 0 | 0 | 0 | 0 |
|  | Phenolic compound | 0 | 0.3 | 0 | 0 | 0 | 0.3 |
|  | Epoxy compound | 0 | 0 | 0.3 | 0.5 | 0 | 0 |
|  | Sulfur compound | 0 | 0 | 0 | 0.1 | 0 | 0 |
| Evaluation | Izod impact strength kJ/m$^2$ | 85 | 75 | 75 | 60 | 65 | 12 |
|  | Flexural modulus MPa | 2100 | 2400 | 2800 | 3500 | 2500 | 3400 |
|  | Volume resistivity | 2 × 10E13 | 2 × 10E3 | 3 × 10E3 | 0.3 | 6 × 10E2 | 0.5 |
|  | Appearance of molded product | No problem | No problem | No problem | No problem | No problem | No problem |
|  | Flame retardancy 3.0 mm | V-0 | V-0 | V-0 | V-0 | V-0 | V-1 |

TABLE 4

|  |  | Comp. Ex. 6 | Comp. Ex. 7 | Comp. Ex. 8 | Comp. Ex. 9 | Comp. Ex. 10 |
|---|---|---|---|---|---|---|
| Formulation | (A) PC | 100 | 99.5 | 90 | 75 | 87 |
|  | ABS | 0 | 0 | 0 | 0 | 10 |
|  | (B) Carbon nanotube 1 | 0 | 0.5 | 3 | 0 | 3 |
|  | Carbon nanotube 2 | 0 | 0 | 0 | 25 | 0 |

TABLE 4-continued

|  |  | Comp. Ex. 6 | Comp. Ex. 7 | Comp. Ex. 8 | Comp. Ex. 9 | Comp. Ex. 10 |
|---|---|---|---|---|---|---|
|  | (D) Phosphorous compound 1 | 0 | 0 | 0 | 0 | 0 |
|  | Phosphorous compound 2 | 0 | 0 | 0 | 0 | 0 |
|  | Phenolic compound | 0 | 0 | 0 | 0 | 0 |
|  | Epoxy compound | 0 | 0 | 0 | 0.3 | 0 |
|  | Sulfur compound | 0 | 0 | 0 | 0 | 0 |
| Evaluation | Izod impact strength kJ/m$^2$ | 85 | 40 | 15 | 8 | 40 |
|  | Flexural modulus MPa | 2100 | 2250 | 2500 | 4200 | 2500 |
|  | Volume resistivity | >10E16 | >10E16 | 1 × 10E5 | 5 | 4 × 10E4 |
|  | Appearance of molded product | No problem | Silver streaks | Silver streaks | Silver streaks | No problem |
|  | Flame retardancy 3 mm | V-2 | V-2 | V-2 | V-0 | V-1 |

EXAMPLES 12 TO 16 AND COMPARATIVE EXAMPLES 11 TO 14

In each Example or Comparative Example, components were mixed in the corresponding proportions shown in Table 5 or 6 [N.B., components (A1), (A2), (B), and (E); based on mass %], and the resultant mixture was fed to a vent-type twin screw extruder (TEM35, product of Toshiba Machine). The mixture was melt-kneaded at 280° C., to thereby form pellets.

In all Examples and Comparative Examples, a phosphorus-containing antioxidant PEP 36 (0.1 parts by mass) serving as a stabilizer was incorporated into the mixture.

The thus-produced pellets were dried at 120° C. for 10 hours and then injection-molded at 280° C. (mold temperature: 80° C.), to thereby produce test pieces.

The thus-obtained test pieces were evaluated in terms of performance through the aforementioned tests. The results are shown in Tables 5 and 6.

The components employed for producing the mixtures are as follows.

[Components]

(A1) Aromatic polycarbonate-polyorganosiloxane copolymer PC-PDMS: prepared in Referential Example 1 below, viscosity average molecular weight=17,000, PDMS content; 4.0 mass %

(A2) Aromatic polycarbonate resin PC-1: FN1700A (product of Idemitsu Petrochemical), viscosity average molecular weight=17,500, terminated with p-tert-butylphenol, and aromatic polycarbonate resin PC-2: prepared in Referential Example 2 below, viscosity average molecular weight=17,500, terminated with p-n-dodecylphenol (B) Carbon nanotube 1: multi-wall, diameter=10 to 30 nm, length=1,000 to 10,000 nm, both ends opened, amorphous carbon particle content of 15 mass % (product of Sun Nanotech), and carbon nanotube 2: multi-wall, diameter=50 to 100 nm, length=1,000 to 10,000 nm, both ends opened, amorphous carbon particle content of 15 mass % (product of Sun Nanotech)

(E) PTFE: CD076 (product of Asahi Glass Fluoropolymers)

The test results shown in Tables 5 and 6 indicate the following.

1. Sole incorporation of PC-PDMS (A1) attains poor flame retardancy and fails to impart conductivity.

2. Sole incorporation of PC (A2) fails to impart flame retardancy and conductivity. When a polycarbonate resin having a long alkyl end group is incorporated, fluidity of the composition is enhanced while other properties are maintained.

3. As the amount of carbon nanotubes (B) increases, conductivity increases. However, an excessive amount of carbon nanotubes reduces impact strength. Elastic modulus is enhanced by increasing the diameter of component (B).

4. Incorporation of PTFE (E) enhances flame retardancy and imparts conductivity while high impact strength is maintained.

TABLE 5

|  |  |  | Ex. 12 | Ex. 13 | Ex. 14 | Ex. 15 | Ex. 16 |
|---|---|---|---|---|---|---|---|
| Formulation | (A1) | PC-PDMS | 99.5 | 50 | 50 | 90 | 50 |
|  | (A2) | PC-1 | — | 47 | 47 | — | — |
|  |  | PC-2 | — | — | — | — | 47 |
|  | (B) | Carbon nanotube 1 | 0.5 | 3 | — | — | 3 |
|  |  | Carbon nanotube 2 | — | — | 3 | 10 | — |
|  | (E) | PTFE | — | 0.3 | 0.1 | 0.1 | 0.3 |
| Evaluation |  | Izod impact strength kJ/m$^2$ | 85 | 75 | 70 | 60 | 70 |
|  |  | Flexural modulus MPa | 2100 | 2400 | 2800 | 3500 | 2400 |
|  |  | Volume resistivity | 5 × 10E13 | 8 × 10E2 | 1 × 10E3 | 0.08 | 5 × 10E2 |
|  |  | Flame retardancy 3.0 mm | V-0 | V-0 | V-0 | V-0 | V-0 |
|  |  | 1.5 mm | — | V-0 | V-0 | V-0 | V-0 |
|  |  | MI (300° C., 1.2 kg) | 18 | 16 | 17 | 16 | 22 |

TABLE 6

|  |  |  | Comp. Ex. 11 | Comp. Ex. 12 | Comp. Ex. 13 | Comp. Ex. 14 |
|---|---|---|---|---|---|---|
| Formulation | (A1) | PC-PDMS | 100 | — | — | 65 |
|  | (A2) | PC-1 | — | 99.5 | 97 | — |
|  | (B) | Carbon nanotube 1 | — | 0.5 | 3 | — |
|  |  | Carbon nanotube 2 | — | — | — | 35 |
|  | (E) | PTFE | — | — | 0.3 | 0.3 |
| Evaluation |  | Izod impact strength kJ/m$^2$ | 85 | 40 | 15 | 5 |
|  |  | Flexural modulus MPa | 2100 | 2250 | 2500 | 4500 |
|  |  | Volume resistivity | >10E16 | >10E16 | 1 × 10E5 | 0.1 |
|  |  | Flame   3.0 mm | V-2 | V-2 | NG | V-0 |
|  |  | retardancy 1.5 mm | — | — | NG | V-0 |
|  |  | MI (300° C., 1.2 kg) | 18 | 17 | 16 | 12 |

Referential Example 1 (Production of PC-PDMS Copolymer)

(1) Production of PC Oligomer

Bisphenol A (60 kg) was dissolved in a 5 mass % aqueous sodium hydroxide solution (400 L), to thereby prepare an aqueous bisphenol A sodium hydroxide solution.

Subsequently, the aqueous bisphenol A sodium hydroxide solution which had been maintained at room temperature and methylene chloride were fed to a tube reactor (inner diameter: 10 mm, tube length: 10 m) through an orifice plate at a flow of 138 L/hour and 69 L/hour, respectively. In addition, phosgene was fed into the reactor at a flow of 10.7 kg/hour. The reaction was continuously carried out for three hours.

The tube reactor employed was a dual tube reactor, and cold water was circulated in the jacket member so as to maintain the temperature of the discharged reaction mixture at 25° C.

The pH of the discharged liquid was adjusted at 10 to 11.

The thus-obtained reaction mixture was allows to stand, and the water phase was removed from the mixture. The methylene chloride phase (220 L) was collected, to thereby yield a PC oligomer (concentration: 317 g/L).

The PC oligomer produced was found to have a polymerization degree of 2 to 4 and a chloroformate group concentration of 0.7 N.

(2) Production of End-Modified Polycarbonate

The PC oligomer (10 L) produced in the aforementioned step (1) was placed in a vessel (inner volume: 50 L) equipped with a stirrer, and p-dodecylphenol having a branched dodecyl group (product of Yuka Schenecktady) (162 g) was dissolved in the oligomer.

Subsequently, an aqueous sodium hydroxide solution (sodium hydroxide 53 g and water 1 L) and triethylamine (5.8 mL) were added to the solution, and the mixture was allowed to react for one hour under stirring at 300 rpm.

Subsequently, a solution of bisphenol A dissolved in aqueous sodium hydroxide solution (bisphenol A: 720 g, sodium hydroxide 412 g, and water: 5.5 L) and methylene chloride (8 L) were added to the above reaction system. The mixture was allowed to react for one hour under stirring at 500 rpm.

After completion of reaction, methylene chloride (7 L) and water (5 L) were added to the reaction mixture, followed by stirring at 500 rpm for 10 minutes. After termination of stirring, the reaction mixture was allowed to stand so as to separate the organic phase from the aqueous phase.

The collected organic phase was sequentially washed with an alkali medium (0.03N NaOH) (5 L), an acid (0.2N hydrochloric acid) (5 L), water (5 L), and water (5 L).

Through evaporation of methylene chloride, a polymer in the form of flakes was produced. The polymer was found to have a viscosity average molecular weight of 17,500.

(3) Production of Reactive PDMS

Octamethylcyclotetrasiloxane (1,483 g), 1,1,3,3-tetramethyldisiloxane (96 g), and 86% sulfuric acid (35 g) were mixed, and the mixture was stirred at room temperature for 17 hours.

After completion of stirring, the oil phase was removed from the mixture. Sodium hydrogencarbonate (25 g) was added to the oil phase, and the mixture was stirred for one hour.

The mixture was filtered, and the filtrate was subjected to vacuum distillation at 150° C. under 3 Torr (4×10$^2$ Pa), to thereby remove low-boiling-point substances and yield an oily substance.

The oily substance (294 g) obtained in the aforementioned step (2) was added to a mixture of 2-allylphenol (60 g) and a platinum chloride-alcoholate complex (as a platinum component) (0.0014 g) at 90° C.

The mixture was stirred for three hours while the temperature was maintained at 90 to 115° C.

The product was extracted by use of methylene chloride, and washed three times with 80% aqueous methanol, to thereby remove excessive 2-allylphenol.

The product was dried over sodium sulfate anhydrate and heated at 115° C. in vacuum, to thereby distil out the solvent.

Through NMR measurement, the produced phenol-terminated PDMS was found to have 30 dimethylsilanoxy repeating units.

(4) Production of PC-PDMS Copolymer

The reactive PDMS (182 g) produced in the aforementioned step (3) was dissolved in methylene chloride (2 L), and the solution was mixed with the PC oligomer (10 L) produced in the aforementioned step (1).

To the mixture, triethylamine (5.7 cc) and a solution of sodium hydroxide (26 g) in water (1 L) were added, and the resultant mixture was allowed to react under stirring at 500 rpm for one hour at room temperature.

After completion of reaction, a solution of bisphenol A (600 g) dissolved in 5.2 wt. % aqueous sodium hydroxide solution (5 L), methylene chloride (8 L), and p-tert-butylphenol (96 g) were added to the aforementioned reaction system. The mixture was allowed to react under stirring at 500 rpm for two hours at room temperature.

After completion of reaction, methylene chloride (5 L) was added to the reaction mixture. The resultant mixture was sequentially washed with water (5 L), 0.03N aqueous sodium hydroxide solution (5 L) (alkali washing), 0.2N hydrochloric acid (5 L) (acid washing), water (5 L), and water (5 L). Finally, methylene chloride was removed out, to thereby yield a PC-PDMS copolymer in the form of flakes.

The thus-produced PC-PDMS copolymer was dried at 120° C. in vacuum for 24 hours. The copolymer was found to have a viscosity average molecular weight of 17,000 and a PDMS content of 4.0 mass %.

The viscosity average molecular weight and the PDPS content were obtained in the following manner.

(1) Viscosity Average Molecular Weight (Mv)

The viscosity of a solution of the polymer in methylene chloride at 20° C. was determined by means of an Ubbelohde viscometer, and the value was reduced to the corresponding intrinsic viscosity [η]. The Mv was calculated from the following equation:

$[\eta]=1.23\times 10^{-5} Mv^{0.83}$ (2) PDMS Content

Calculated on the basis of the ratio of the $^1$H-NMR peak signal intensity of a methyl (isopropyl) group of bisphenol A observed at 1.7 ppm to that of a methyl group of dimethylsiloxane observed at 0.2 ppm.

Referential Example 2 (Production of p-n-dodecylphenol-terminated Polycarbonate Resin)

The PC oligomer (10 L) produced in Referential Example 1 was placed in a vessel (inner volume: 50 L) equipped with a stirrer, and p-n-dodecylphenol (162 g) was dissolved in the oligomer.

Subsequently, an aqueous sodium hydroxide solution (sodium hydroxide 53 g and water 1 L) and triethylamine (5.8 cc) were added to the solution, and the mixture was allowed to react for one hour under stirring at 300 rpm.

Subsequently, a solution of bisphenol A dissolved in sodium hydroxide solution (bisphenol: 720 g, sodium hydroxide 412 g, and water: 5.5 L) and methylene chloride (8 L) were added to the above reaction system. The mixture was allowed to react for one hour under stirring at 500 rpm.

After completion of reaction, methylene chloride (7 L) and water (5 L) were added to the reaction mixture, followed by stirring at 500 rpm for 10 minutes. After termination of stirring, the reaction mixture was allowed to stand so as to separate the organic phase from the aqueous phase.

The collected organic phase was sequentially washed with an alkali medium (0.03N NaOH) (5 L), an acid (0.2N hydrochloric acid) (5 L), water (5 L), and water (5 L).

Thereafter, through evaporation of methylene chloride, a polymer in the form of flakes was produced. The polymer was found to have a viscosity average molecular weight of 17,500.

INDUSTRIAL APPLICABILITY

The thermoplastic resin compositions of invention 1 and 2 have excellent flame retardancy, impact strength, and conductivity, and provides a molded product of excellent appearance.

The polycarbonate resin composition of invention 3 has excellent flame retardancy, impact strength, and conductivity, and provides a molded product of excellent appearance.

In addition, contamination of a semiconductor or a similar material by carbon which would be released from the resin composition can be prevented.

Thus, the resin compositions are envisaged to be applicable in a wide range to housings and parts of electric/electronic apparatuses such as office automation apparatuses, information technology devices, and household electric appliances as well as automobile parts.

The invention claimed is:

1. A polycarbonate resin composition comprising 100 parts by mass of a mixture of an aromatic polycarbonate-polyorganosiloxane copolymer (A1) having an end group represented by formula (1):

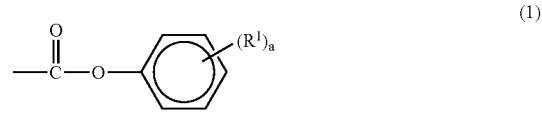

(wherein $R_1$ represents an alkyl group having 1 to 35 of carbon atoms and a is an integer from 0 to 5), an aromatic polycarbonate resin (A2) having an end group represented by formula (2):

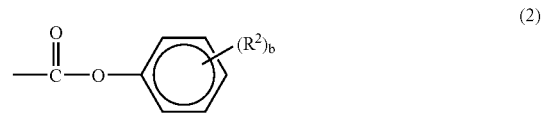

(wherein $R_2$ represents an alkyl group having 1 to 35 of carbon atoms and b is an integer of 0 to 5), and carbon nanotubes (B), the mixture comprising the component (A1) in an amount of 0.1 to 99.9 mass %, the component (A2) in an amount of 0 to 99.8 mass %, and the component (B) in an amount of 0.1 to 30 mass %; and a polytetrafluoroethylene resin (E) in an amount of 0 to 2 parts by mass.

2. A polycarbonate resin composition as described in claim 1, wherein the aromatic polycarbonate-polyorgaflosiloxane copolymer has a polyorganosiloxane moiety which is a polydimethylsiloxane (PDMS) skeleton.

3. A polycarbonate resin composition as described in claim 2, which is comprised of polydimethylsiloxane (PDMS) in an amount of 0.1 to 10 mass %.

4. A polycarbonate resin composition as described in claim 1, wherein the aromatic polycarbonate resin has an alkyl group having 10 to 35 of carbon atoms at an end of the molecule.

5. A polycarbonate resin composition as described in claim 1, wherein the carbon nanotubes are comprised of amorphous carbon particles in an amount of 20 mass % or less and have a diameter of 0.5 to 120 nm and a length of 500 nm or more.

6. A polycarbonate resin composition as described in claim 1, wherein the carbon nanotubes have open ends.

7. A molded product of a polycarbonate resin composition as recited in claim 1.

8. A thermoplastic resin composition comprising 100 parts by mass of a mixture of a thermoplastic resin (A) and carbon nanotubes (B), the mixture comprising the component (A) in an amount of 80 to 99.95 mass % and the component (B) in an amount of 0.05 to 20 mass %; a flame retardant (C) in an amount of 0.05 to 30 parts by mass; and a polyfluoroolefin resin in an amount of 0 to 2 parts by mass, wherein the carbon nanotubes are comprised of amorphous carbon particles in an amount of 20 mass % or less and have a diameter of 0.5 to 120 nm and a length of 500 nm or more.

9. A thermoplastic resin composition as described in claim 8, wherein the thermoplastic resin is a polycarbonate resin.

10. A thermoplastic resin composition as described in claim 8, wherein the thermoplastic resin is a polymer alloy comprising two or more thermoplastic resins.

11. A thermoplastic resin composition as described in claim 10, wherein the polymer alloy is comprised of a polycarbonate resin and a styrene resin.

12. A thermoplastic resin composition as described in claim 8, wherein the carbon nanotubes have open ends.

13. A thermoplastic resin composition as described in claim 8, wherein the flame retardant contains no chlorine atom or bromine atom.

14. A thermoplastic resin composition as described in claim 8, wherein the flame retardant is a phosphorus-containing flame retardant and/or a silicone flame retardant.

15. A molded product of a thermoplastic resin composition as recited in claim 8.

16. A thermoplastic resin composition comprising 100 parts by mass of a mixture of a thermoplastic resin (A) and carbon nanotubes (B), the mixture comprising the component (A) in an amount of 80 to 99.9 mass % and the component (B) in an amount of 0.1 to 20 mass %; and at least one compound (flame retardant) (D) selected from among a phosphorus-containing flame retardant, a phenolic flame retardant, an epoxy-based flame retardant, and a sulfur-containing flame retardant, in an amount of 0.005 to 2 parts by mass, wherein the carbon nanotubes are comprised of amorphous carbon particles in an amount of 20 mass % or less and have a diameter of 0.5 to 120 nm and a length of 500 nm or more.

17. A thermoplastic resin composition as described in claim 16, wherein the thermoplastic resin is a polycarbonate resin.

18. A thermoplastic resin composition as described in claim 16, wherein the thermoplastic resin is a polymer alloy comprising two or more thermoplastic resins.

19. A thermoplastic resin composition as described in claim 18, wherein the polymer alloy is comprised of a polycarbonate resin and a styrene resin.

20. A thermoplastic resin composition as described in claim 16, wherein the carbon nanotubes have open ends.

21. A thermoplastic resin composition as described in claim 16, wherein the phosphorus-containing flame retardant is a phosphite ester.

22. A molded product of a thermoplastic resin composition as recited in claim 16.

* * * * *

UNITED STATES PATENT AND TRADEMARK OFFICE
CERTIFICATE OF CORRECTION

PATENT NO. : 7,307,120 B2
APPLICATION NO. : 10/500458
DATED : December 11, 2007
INVENTOR(S) : Akio Nodera It is certified that error appears in the above-identified patent and that said Letters Patent is hereby corrected as shown below:

On the title page, item (86) should read as follows:

-- PCT No.: PCT/JP03/00760 --

Signed and Sealed this

Eighth Day of April, 2008

JON W. DUDAS
*Director of the United States Patent and Trademark Office*